US008141042B2

(12) United States Patent
Gan et al.

(10) Patent No.: US 8,141,042 B2
(45) Date of Patent: Mar. 20, 2012

(54) EXTENDING PORTABILITY OF JAVA CODE THROUGH THE USE OF AOP

(75) Inventors: Zhi Gan, Beijing (CN); Ying Chun Guo, Beijing (CN); Rahul Kurane, Austin, TX (US); Aravind Srinivasan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1362 days.

(21) Appl. No.: 11/682,413

(22) Filed: Mar. 6, 2007

(65) Prior Publication Data
US 2008/0222607 A1 Sep. 11, 2008

(51) Int. Cl.
G06F 9/44 (2006.01)
(52) U.S. Cl. .................. 717/121; 717/104; 717/118
(58) Field of Classification Search .................. 717/121
See application file for complete search history.

(56) References Cited

U.S. PATENT DOCUMENTS

| | | | |
|---|---|---|---|
| 6,378,053 B1* | 4/2002 | Lamaire et al. | 711/159 |
| 6,467,086 B1* | 10/2002 | Kiczales et al. | 717/165 |
| 6,539,433 B1* | 3/2003 | Tominaga et al. | 709/246 |
| 6,728,852 B1* | 4/2004 | Stoutamire | 711/170 |
| 6,986,143 B2* | 1/2006 | Cole et al. | 719/315 |
| 7,506,175 B2* | 3/2009 | Baentsch et al. | 713/187 |
| 7,844,965 B2* | 11/2010 | Kraenzel | 718/100 |
| 2001/0024239 A1* | 9/2001 | Feder et al. | 348/423.1 |
| 2002/0012329 A1* | 1/2002 | Atkinson et al. | 370/330 |
| 2002/0093856 A1* | 7/2002 | Baentsch et al. | 365/200 |
| 2003/0149683 A1* | 8/2003 | Lee et al. | 707/1 |
| 2003/0159035 A1* | 8/2003 | Orthlieb et al. | 713/168 |
| 2003/0212879 A1* | 11/2003 | Henkel et al. | 712/208 |
| 2003/0237050 A1* | 12/2003 | Davidov et al. | 715/513 |
| 2004/0015884 A1* | 1/2004 | Shann et al. | 717/131 |
| 2004/0148613 A1* | 7/2004 | Yach et al. | 719/331 |
| 2005/0071806 A1* | 3/2005 | Sreedhar | 717/104 |
| 2005/0240938 A1* | 10/2005 | Lane | 719/310 |
| 2006/0168492 A1* | 7/2006 | Haselden et al. | 714/746 |
| 2006/0230319 A1* | 10/2006 | Ryali et al. | 714/38 |
| 2007/0022409 A1* | 1/2007 | Levenshteyn | 717/136 |

(Continued)

OTHER PUBLICATIONS

Ian Utting, "Problems in the initial teaching of programming using Java: The case for replacing J2SE with J2ME", Jun. 2006, University of Kent at Canterbury, UK; (Utting.pdf).*

(Continued)

Primary Examiner — Emerson Puente
Assistant Examiner — Hiren Patel
(74) Attorney, Agent, or Firm — Law Office of Jim Boice

(57) ABSTRACT

A computer-implementable method, system and computer-usable medium for extending the portability of code to a limited-class environment are disclosed. In a preferred embodiment, the method includes the steps of: identifying any full-version-only objects that are not in a reduced-version of a language, wherein the reduced-version of the language comprises a reduced portion of objects that are in a full-version of the language; associating a full-version-only object with a set of one or more objects in the reduced-version of the language, wherein the full-version-only object is functionally equivalent to the set of one or more objects in the reduced-version of the language; identifying any full-version-only objects in a software program; and creating a reduced-version of the software program by replacing any identified full-version-only objects with a functionally equivalent set of one or more objects from the reduced-version of the language.

14 Claims, 8 Drawing Sheets

U.S. PATENT DOCUMENTS

2007/0136367 A1* 6/2007 van Wyk et al. .......... 707/103 R
2008/0168422 A1* 7/2008 Cheng et al. .................. 717/114

OTHER PUBLICATIONS

Hilsdale et al., The Next Steps for Aspect-Oriented Programming Languages (in Java), 2001, Xerox Palo Alto Research Center, (Hilsdale.pdf).*

Kiczales et al., "An Overview of AspectJ", 2001, University of Bristish Columbia, Xerox Palo Alto Research Center, (Kiczales_AspectJ.pdf).*

Zhang, W., Jarzabek, S., Loughran, N., Rashid, A., (2003), "Reengineering a PC-Based System into the Mobile Device Product Line", Proceedings of the International Workshop on Principles of Software Evolution (IWPSE 2003), Sep. 1-2, 2003.

"JDiet: Java SE 1.4 to Java ME CLDC converter", http://spoon.gforge.inria.fr/JDiet/Main, last updated Feb. 28, 2007, pp. 1-2.

"JavaTM 2 Platform Standard Edition 5.0 API Specification", http://dowload.oracle.com/javase/1.5.0/docs/api/overview-summary.html, pp. 1-12.

Sun Microsystems, Inc., "Connected Limited Device Configuration Specification Version 1.1" Mar. 4, 2003, pp. 1-60.

* cited by examiner

US 8,141,042 B2

EXTENDING PORTABILITY OF JAVA CODE THROUGH THE USE OF AOP

BACKGROUND OF THE INVENTION

The present invention relates in general to the field of computers and similar technologies, and in particular to software utilized in this field. Still more particularly, the present disclosure relates to implementing software in a limited environment.

Java™ is an Object-Oriented Program (OOP) that is designed to be platform independent. An application written in Java™ is first compiled into generic bytecode, which is a binary code that is designed to be executed by a virtual machine rather than by dedicated hardware. The compiled bytecode is then converted, by a Java™ Virtual Machine (JVM), into native code that is used in a particular hardware environment.

Java™ comes in many different versions, including full-class versions and limited-class versions. Examples of full-class versions, which include most, if not all, of the Java™ classes, are Java 2 Platform, Standard Edition (J2SE™) and Java 2 Platform, Enterprise Edition (J2EE™). An exemplary limited-class version of Java™ is Java 2 Platform, Micro Edition (J2ME™). Although J2ME™ has fewer classes than J2SE™ or J2EE™, it is still useful in equipment that has limited memory and/or computing power, such as cell phones, portable gaming devices, etc.

Since J2ME™ does not support all of the classes found in J2SE™ or J2EE™, it is usually not possible to run a program written in J2SE™ or J2EE™ in a J2ME™ environment. For example, consider FIG. 1, which shows code that is designed to run in a full-class version of Java™, and is depicted as J2SE™ level code 102. This J2SE™ level code 102 is designed to use, in an unrestricted manner, the full-version of classes found in J2SE™ classes 104. However, now assume that, as shown in FIG. 2, the J2SE™ level code 102 is being deployed to an environment in which only J2ME™ classes 202 are available, resulting in many absent J2SE™ classes 204, which are part of the J2SE™ classes 104 shown in FIG. 1. Since the J2SE™ level code 102 needs classes that are absent from the J2ME™ classes 202, the J2SE™ level code 102 cannot execute.

SUMMARY OF THE INVENTION

To address the problem described above, presently disclosed is a computer-implementable method, system and computer-usable medium for extending the portability of code to a limited-class environment. In a preferred embodiment, the method includes the steps of: identifying any full-version-only objects that are not in a reduced-version of a language, wherein the reduced-version of the language comprises a reduced portion of objects that are in a full-version of the language; associating a full-version-only object with a set of one or more objects in the reduced-version of the language, wherein the full-version-only object is functionally equivalent to the set of one or more objects in the reduced-version of the language; identifying any full-version-only objects in a software program; and creating a reduced-version of the software program by replacing any identified full-version-only objects with a functionally equivalent set of one or more objects from the reduced-version of the language.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
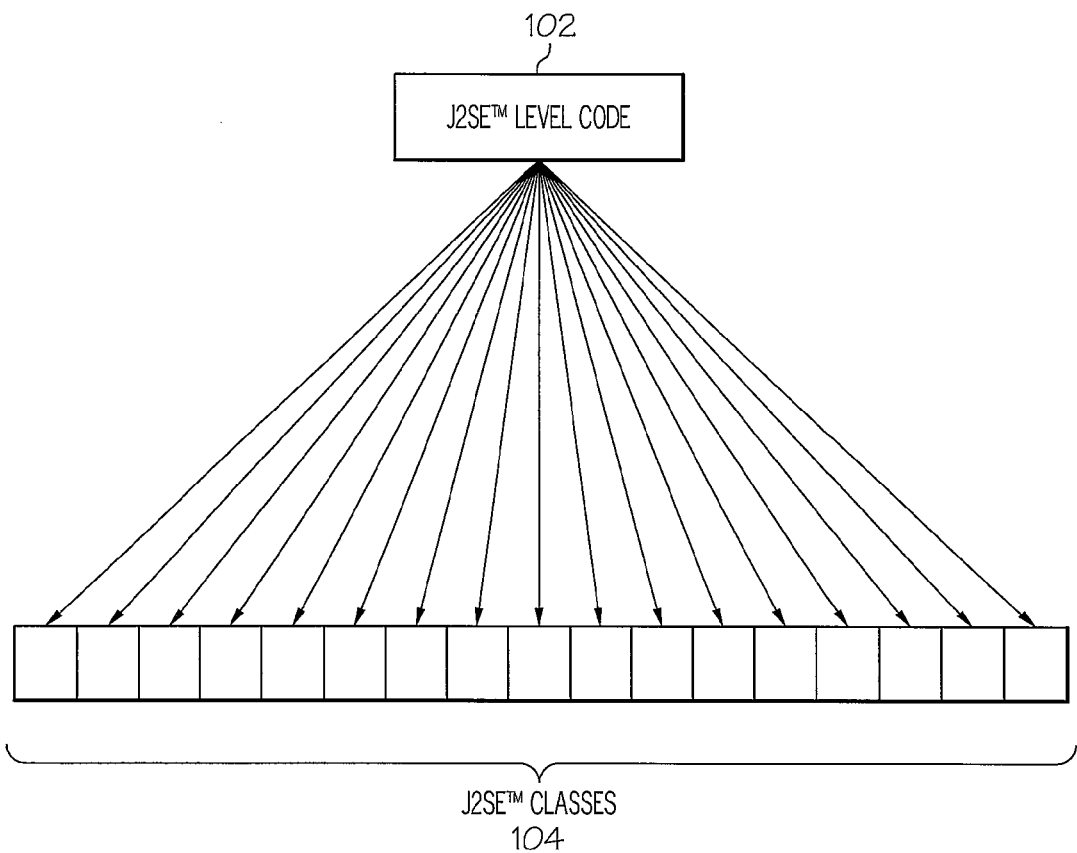
FIG. 1 depicts a prior art J2SE™ level code that has all J2SE™ classes available to it for execution.
Figure 2:
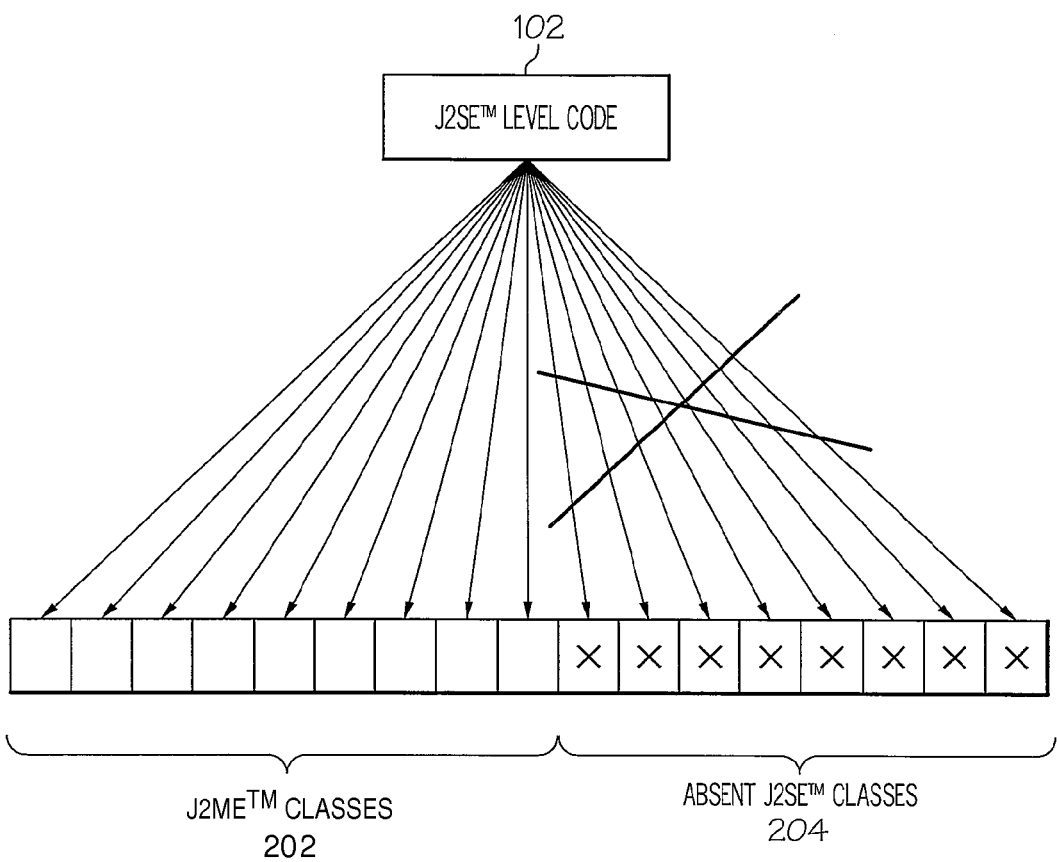
FIG. 2 illustrates the J2SE™ shown in FIG. 1 as being unable to execute due to a limited number of available classes in a J2ME™ environment.
Figure 3:
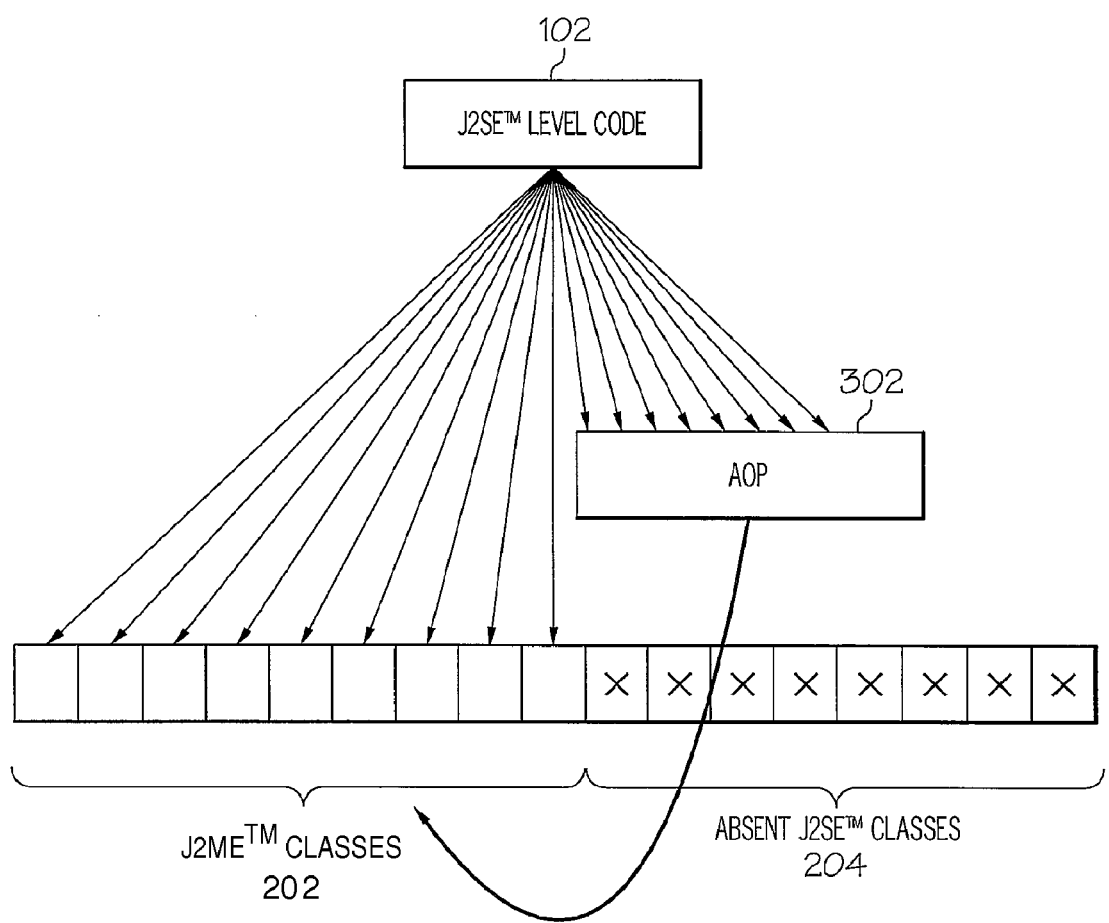
FIG. 3 depicts a novel use of Aspect-Oriented Programming (AOP) to hook sets of J2ME™ classes into the J2SE™ level code, thus enabling execution of the J2SE™ level code.

Referring now to FIG. 3, a high-level depiction of a novel use of Aspect-Oriented Programming (AOP) 302 to hook sets of J2ME™ classes into the J2SE™ level code 202, thus enabling execution of the J2SE™ level code 102, is presented. As suggested in FIG. 3, the J2SE™ level code 102, although written to have access to all J2SE™ classes, only has access to the J2ME™ classes 202, which lacks the remaining J2SE™ classes (absent J2SE™ classes 204). To compensate for the absent J2SE™ classes 204, aspects in AOP 302 are used to hook into predefined sets of J2ME™ classes 202. These predefined sets of J2ME™ classes 202 are capable of performing a same function as a single missing class in absent J2SE™ classes 204.

To understand how AOP 302 intercepts a call to a class in the absent J2SE™ classes 204 and forwards that call to sets of classes in the available J2ME™ classes 202, an overview of AOP is now presented. As the name implies, Aspect-Oriented Programming is based on the use of aspects. An aspect is defined as a subprogram that packages advice (as it is called in the AOP program AspecJ™) and pointcuts into a functional unit. Advice is defined as operative software code that is able to cross-cut (be applied to other units of) an existing object model. A pointcut defines a point in the object model where advice is applied.

Figure 4:
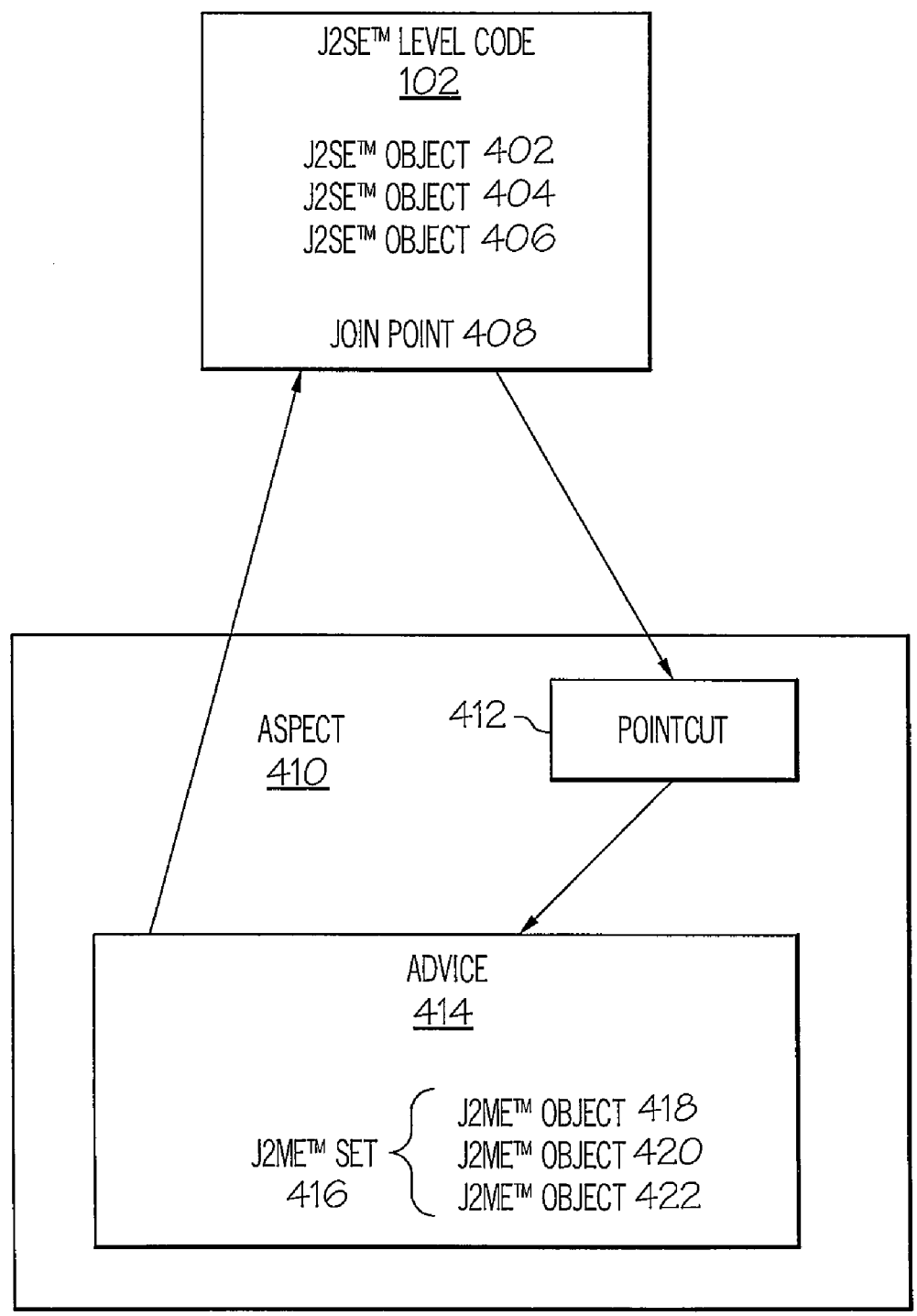
FIG. 4 illustrates a novel use of a join point and a pointcut to insert J2ME™ objects into J2SE™ level code.

An example of how AOP may operate in the context of the present disclosure is shown in FIG. 4. Assume, for purposes of illustration, that J2SE™ level code 102 includes J2SE™ objects 402, 404, and 406. When J2SE™ level code 102 was written, a determination was made that 1) the J2SE™ level code 102 will be deployed to a platform that only supports the reduced-version J2ME™; and 2) the limited version J2ME™ does not have, in its library, an object that is identical to (or, alternatively, is functionally equivalent to) J2SE™ object 406. Therefore, the programmer inserted a join point 408 at J2SE™ object 406. Join point 408 calls, via a pointcut 412 in an aspect 410, an advice 414. Advice 414 is a J2ME™ set 416 of J2ME™ objects 418, 420, and 422. J2ME™ set 416 has been predetermined, either by the programmer or via an automated matching system (not shown), to be functionally equivalent to J2SE™ object 406. Thus, aspect 410 returns J2ME™ set 416 to the J2SE™ level code 102, which can now execute (compile into bytecode and then native code in the J2ME™-running device) the J2SE™ level code 102. That is, the J2SE™ object 402 and J2SE™ object 404 (or the functional equivalent) are found in J2ME™, and thus execute without incident. The non-J2ME™ object (J2SE™ object 406) has been overridden by the J2ME™ set 416. Thus, all code in the newly modified J2SE™ level code 102 is executable in the J2ME™ environment.

Figure 5:
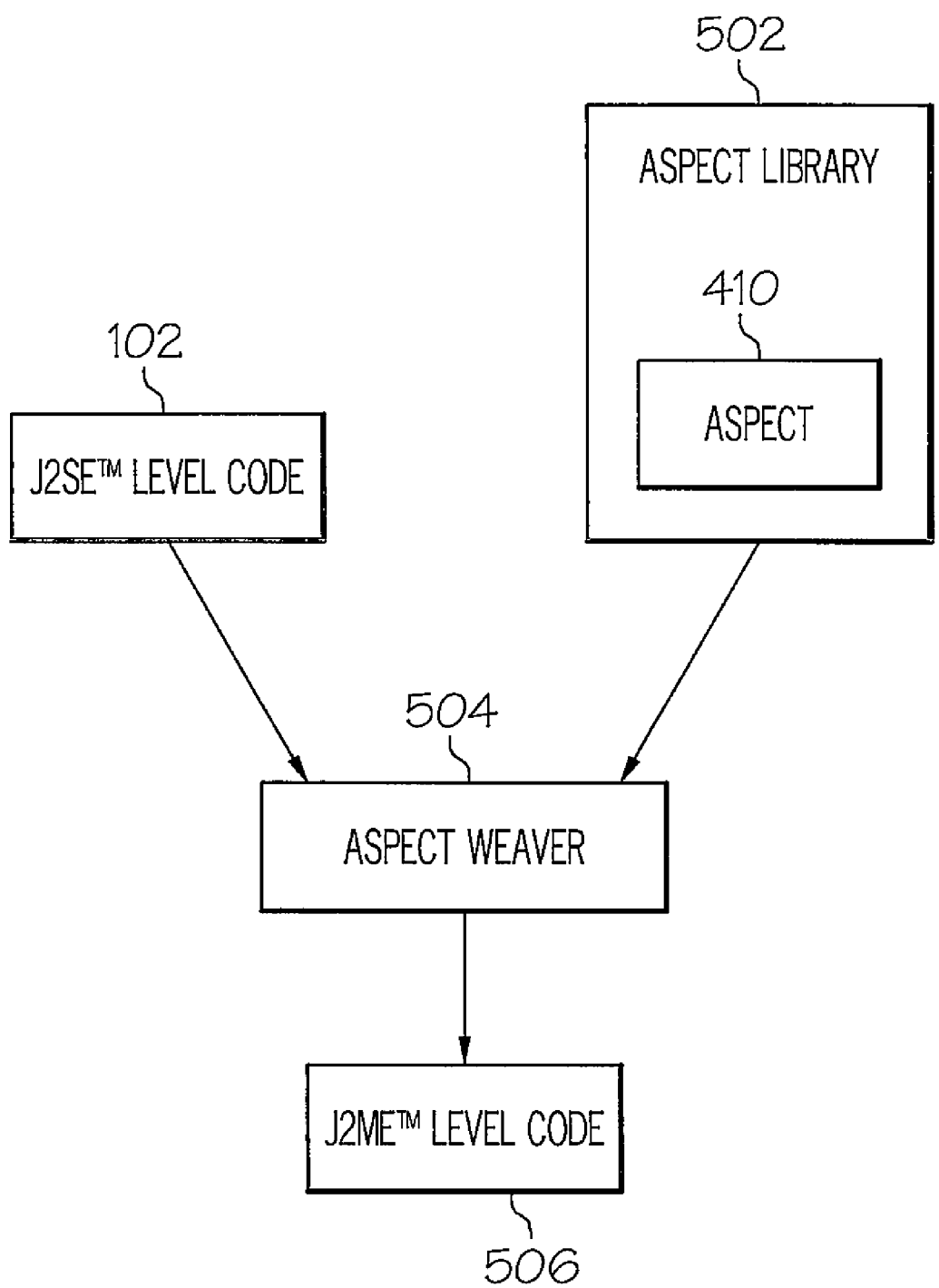
FIG. 5 is a high-level overview of one aspect of the present disclosure, in which J2SE™ level code and aspects associated with properties of J2ME™ are woven to create J2ME™ level code.

Referring now to FIG. 5, another overview of the presently disclosed process is presented. In FIG. 5, the J2SE™ level code 102 and an aspect 410 (found in an aspect library 502) are input to an aspect weaver 504, which is a special compiler that generates byte code by using the J2ME™-friendly code (e.g., J2SE™ objects 402 and 404 shown in FIG. 4) and the hooked-in advice 414 (e.g., J2ME™ set 416) as inputs. This results in a J2ME™ level code 506 which can be executed (converted into native code) in the J2ME™-enabled device (e.g., J2ME™ device 854 shown below in FIG. 8).

Figure 6:
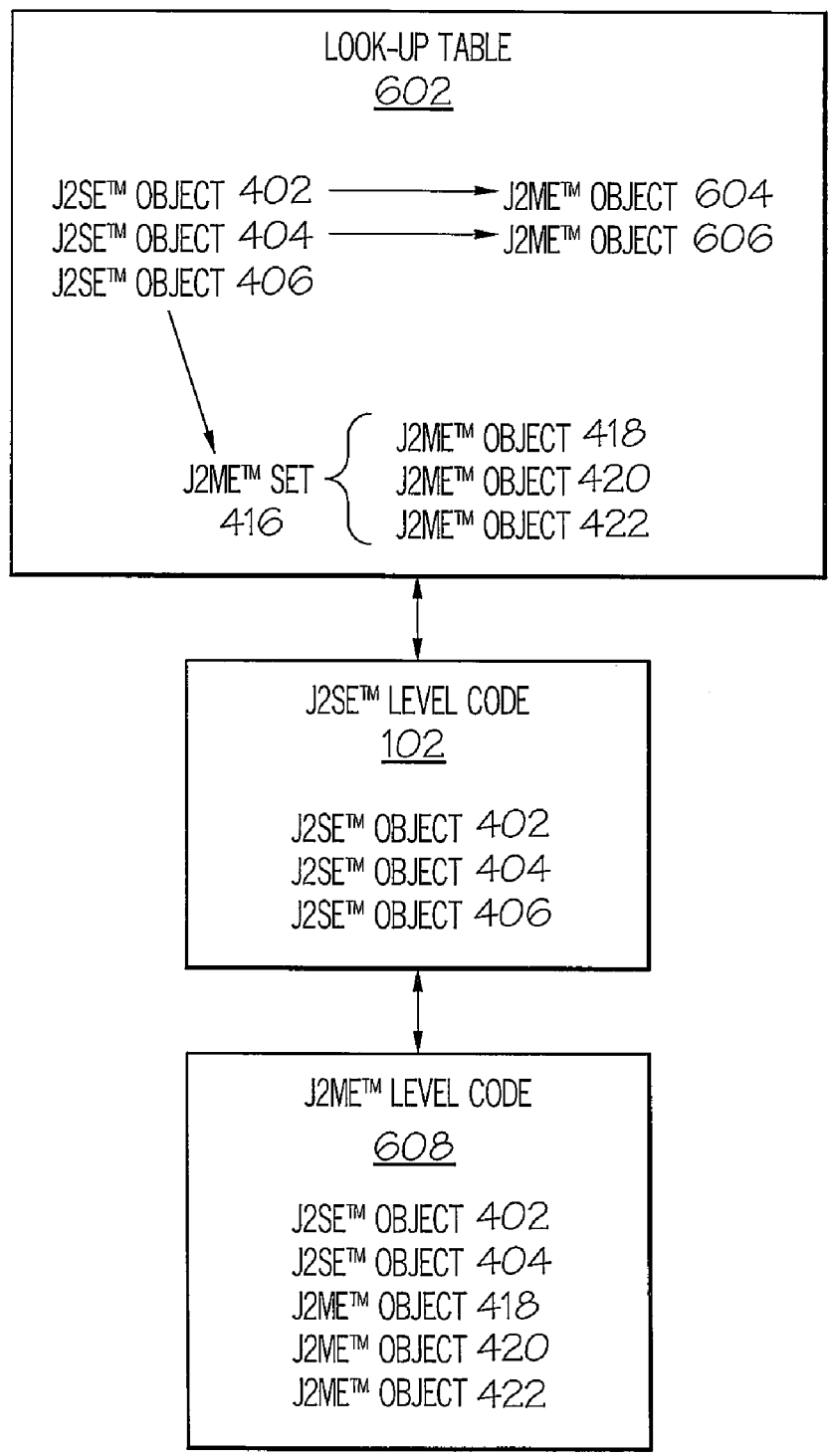
FIG. 6 illustrates an alternate method in which J2SE™ code can be transformed into J2ME™ code by using a look-up table without the use of join points.

While FIGS. 4-5 show an elegant embodiment of the presently disclosed process, FIG. 6 illustrates an alternate method in which J2SE™ code can be transformed into J2ME™ code without using join points. Specifically, rather than using a join point 408 to hook into a pointcut 412 (as described in FIG. 4), a look-up table 602 may be used to scrutinize each object in the J2SE™ level code 102. That is, prior to being compiled into byte code, each object in J2SE™ level code 102 is evaluated using look-up table 602. If an object has the same (or, alternatively, functionally equivalent) object, then no substitution is made. For example, J2SE™ object 402 may be the exact same object as J2ME™ object 604, since J2ME™ is merely a subset of objects found in J2SE™. Alternatively, J2SE™ object 404 may be functionally equivalent to J2ME™ object 606, which is also an object found in the J2SE™ library of objects, but is not exactly the same as J2SE™ object 404. Nonetheless, in the context of the J2ME™ environment in which the J2SE™ level code 102 will be running, it may be determined that J2SE™ object 404 and J2ME™ object 606 are functionally equivalent. Finally, since the J2ME™ environment does not have a J2SE™ object 406 (or its functional equivalent), then the J2SE™ object 406 is replaced by the J2ME™ set 416 to create the final compilable J2ME™ level code 608.

Figure 7:
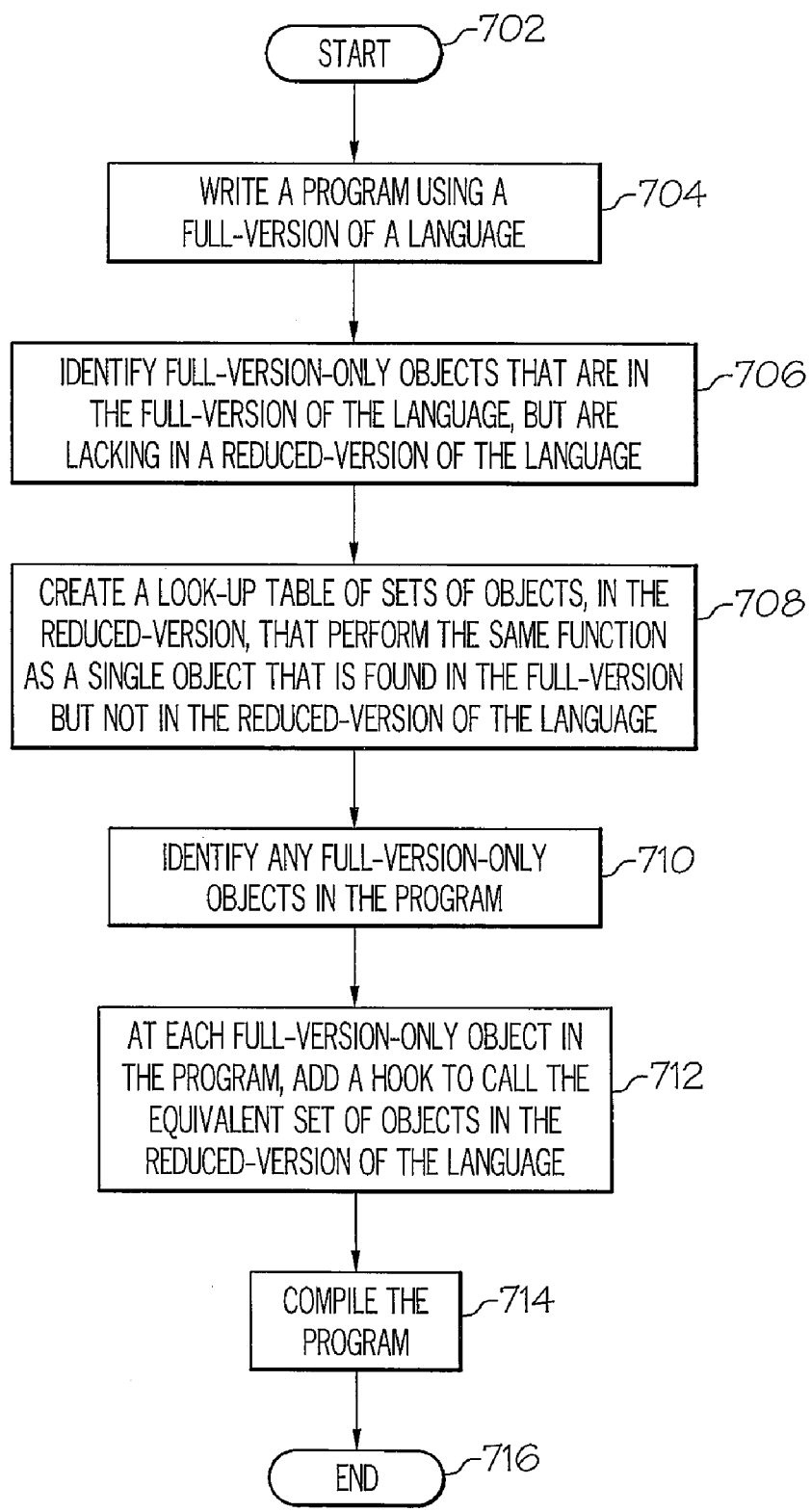
FIG. 7 is a flow-chart of exemplary steps taken to convert a program written in a full-version of a language, such as J2SE™, into a program that can run in a reduced-version of the language, such as J2ME™.

With reference now to FIG. 7, a flow-chart of exemplary steps taken to extend the portability of a program is presented. After initiator block 702, a program is written (block 704) using a full-version of a language (e.g., J2SE™). A table is then constructed that identifies which objects are in the full-version of the language but are lacking in a reduced-version (e.g., J2ME™) of the language (block 706). A look-up table is then created (block 708). This look-up table identifies which objects in the program can be replaced with equivalent objects or sets of objects found in the reduced-version of the language. Any such full-version-only objects are identified (block 710) and replaced with the equivalent objects or sets of objects found in the reduced-version of the language (block 712). The program is now in a format that can be compiled using a reduced-version compiler (block 714), and the process ends (terminator block 716).

Figure 8:
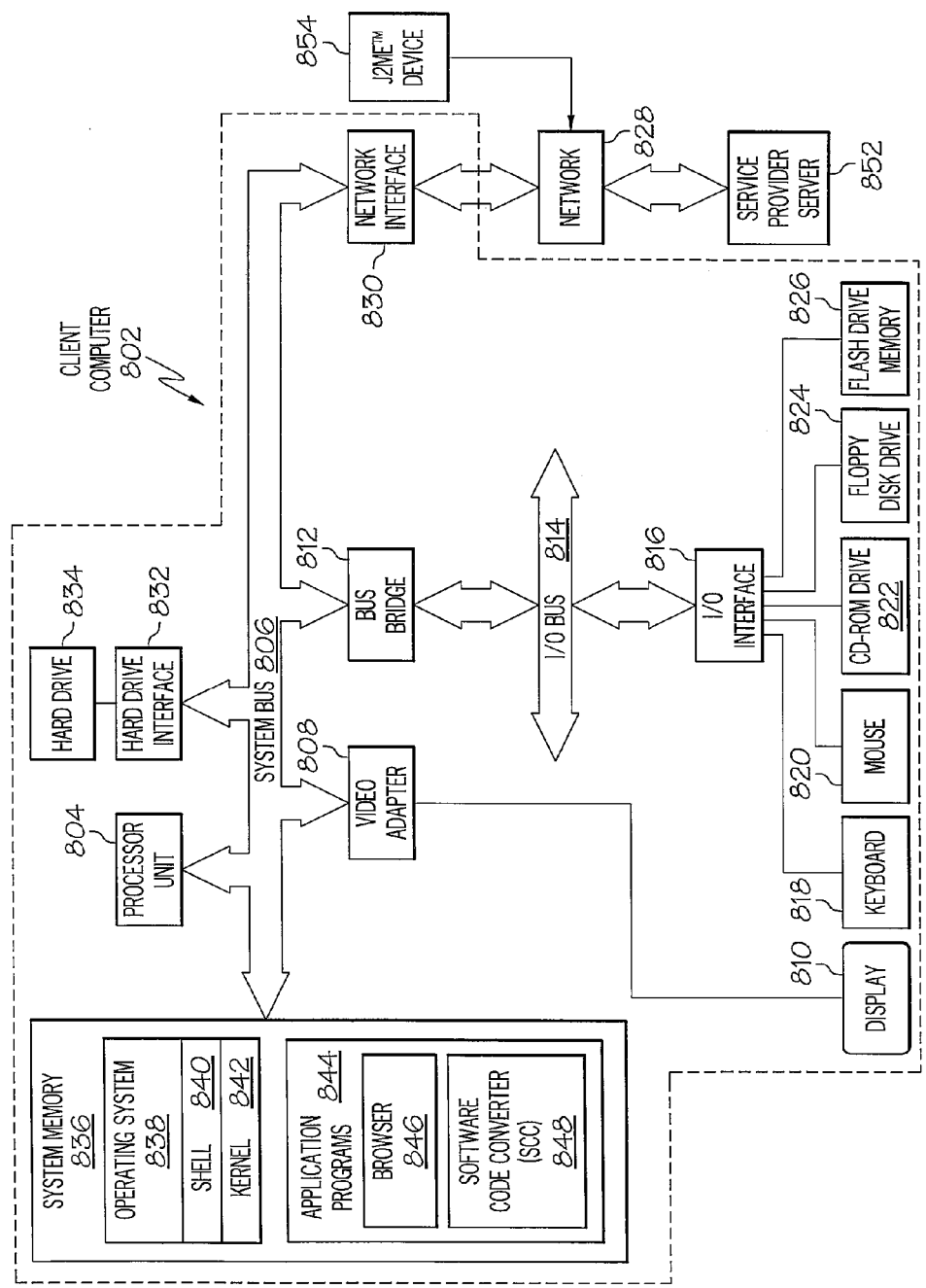
FIG. 8 depicts an exemplary computer in which the present invention may be implemented.

With reference now to FIG. 8, there is depicted a block diagram of an exemplary client computer 802, in which the present invention may be utilized. Client computer 802 includes a processor unit 804 that is coupled to a system bus 806. A video adapter 808, which drives/supports a display 810, is also coupled to system bus 806. System bus 806 is coupled via a bus bridge 812 to an Input/Output (I/O) bus 814. An I/O interface 816 is coupled to I/O bus 814. I/O interface 816 affords communication with various I/O devices, including a keyboard 818, a mouse 820, a Compact Disk-Read Only Memory (CD-ROM) drive 822, a floppy disk drive 824, and a flash drive memory 826. The format of the ports connected to I/O interface 816 may be any known to those skilled in the art of computer architecture, including but not limited to Universal Serial Bus (USB) ports.

Client computer 802 is able to communicate with a service provider server 852 via a network 828 using a network interface 830, which is coupled to system bus 806. Network 828 may be an external network such as the Internet, or an internal network such as an Ethernet or a Virtual Private Network (VPN). Service provider server 852 may utilize a similar architecture design as that described for client computer 802.

A hard drive interface 832 is also coupled to system bus 806. Hard drive interface 832 interfaces with a hard drive 834. In a preferred embodiment, hard drive 834 populates a system memory 836, which is also coupled to system bus 806. Data that populates system memory 836 includes client computer 802's operating system (OS) 838 and application programs 844.

OS 838 includes a shell 840, for providing transparent user access to resources such as application programs 844. Generally, shell 840 is a program that provides an interpreter and an interface between the user and the operating system. More specifically, shell 840 executes commands that are entered into a command line user interface or from a file. Thus, shell 840 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 842) for processing. Note that while shell 840 is a text-based, line-oriented user interface, the present invention will equally well support other user interface modes, such as graphical, voice, gestural, etc.

As depicted, OS 838 also includes kernel 842, which includes lower levels of functionality for OS 838, including providing essential services required by other parts of OS 838 and application programs 844, including memory management, process and task management, disk management, and mouse and keyboard management.

Application programs 844 include a browser 846. Browser 846 includes program modules and instructions enabling a World Wide Web (WWW) client (i.e., client computer 802) to send and receive network messages to the Internet using HyperText Transfer Protocol (HTTP) messaging, thus enabling communication with service provider server 852.

Application programs 844 in client computer 802's system memory also include a Software Code Converter (SCC) 848, which includes logic for implementing, preferably via an AOP logic that is included in SCC 848, the steps and processes described above in FIGS. 3-7. In a preferred embodiment, service provider server 852 also has a copy of SCC 848, which may be executed by or downloaded from service provider server 852, as described below. In one embodiment, client computer 802 is able to download SCC 848 from service provider server 852.

Also coupled to network 828 are one or more devices that run on a reduced-version of a language that client computer 802 runs in a full-version. An exemplary device is shown as a J2ME™ device 854, which operates on a limited version of Java™, while client computer 802 runs on a full-version of Java™ (e.g., J2SE™), as described above.

The hardware elements depicted in client computer 802 are not intended to be exhaustive, but rather are representative to highlight essential components required by the present invention. For instance, client computer 802 may include alternate memory storage devices such as magnetic cassettes, Digital Versatile Disks (DVDs), Bernoulli cartridges, and the like. These and other variations are intended to be within the spirit and scope of the present invention.

As noted above, SCC 848 can be downloaded to client computer 802 from service provider server 852. This deployment may be performed in an "on demand" basis manner, in which SCC 848 is only deployed when needed by client computer 802. Note further that, in another preferred embodiment of the present invention, service provider server 852 performs all of the functions associated with the present invention (including execution of SCC 848), thus freeing client computer 802 from using its resources. In another embodiment, process software for the method so described may be deployed to service provider server 852 by another service provider server (not shown).

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, presently disclosed are a method, system and computer-readable medium for expanding the portability of code. In a preferred embodiment, the method includes the steps of: identifying any full-version-only objects that are not in a reduced-version of a language, wherein the reduced-version of the language comprises a reduced portion of objects that are in a full-version of the language; associating a full-version-only object with a set of one or more objects in the reduced-version of the language, wherein the full-version-only object is functionally equivalent to the set of one or more objects in the reduced-version of the language; identifying any full-version-only objects in a software program; and creating a reduced-version of the software program by replacing any identified full-version-only objects with a functionally equivalent set of one or more objects from the reduced-version of the language. In one embodiment, the method further includes the step of deploying the reduced-version of the software program to a device that supports only the reduced-version of the language. A join point may be inserted at an identified full-version-only object in the software program, wherein the join point calls an aspect to override the identified full-version-only object with an advice, and wherein the advice contains the functionally equivalent set of one or more objects contained in the reduced-version of the language. In one embodiment, the method further includes the step of comparing every object in the software program to entries in a look-up table, wherein the look-up table identifies which objects in the reduced-version of the language are duplicates of the full-version-only objects, and wherein the look-up table identifies which set of multiple-objects, or which single objects, in the reduced-version of the language is functionally equivalent to a full-version-only object. In a preferred embodiment, the full-version of the language described herein is J2SE™ and the limited version of the language is J2ME™.

While the present invention has been particularly shown and described with reference to a preferred embodiment, it will be understood by those skilled in the art that various changes in form and detail may be made therein without departing from the spirit and scope of the invention. For example, while the present disclosure has been described in the context of J2SE™ and J2ME™ code, it is understood that the concepts and processes described herein may equally be applied to any full-version of a language (e.g., J2SE™, J2EE™, etc.) being modified to run in a limited version of that language (e.g., J2ME™). Similarly, while the present disclosure has referred to altering objects, the concepts and processes described herein may be equally useful when applied to linear code, macros, methods, compiled code, machine code, etc. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer implemented method comprising:
a processor identifying any full-version-only objects that are not in a reduced-version of a language, wherein the reduced-version of the language comprises a subset of objects that are in a full-version of the language;
the processor associating a full-version-only object with a set of multiple objects in the reduced-version of the language, wherein the full-version-only objects and the set of multiple objects in the reduced-version of the language are mutually exclusive, and wherein the full-version-only object is functionally equivalent to the set of multiple objects in the reduced-version of the language;
the processor identifying said any full version only objects in a software program by constructing a look-up table that identifies which objects from a full version of the language are lacking in the reduced-version of the language;
the processor utilizing the look-up table to replace any identified full-version-only objects with the functionally equivalent set of multiple objects from the reduced-version of the language; and
the processor creating a reduced-version of the software program by replacing any identified full-version-only objects with a functionally equivalent set of multiple objects from the reduced-version of the language.

2. The computer implemented method of claim 1, further comprising:
deploying the reduced-version of the software program to a device that supports only the reduced-version of the language.

3. The computer implemented method of claim 1, further comprising:
inserting a join point at an identified full-version-only object in the software program, wherein the join point calls an aspect to override the identified full-version-only object with an advice, and wherein the advice contains the functionally equivalent set of one or more objects contained in the reduced-version of the language.

4. The computer implemented method of claim 1, further comprising:
comparing every object in the software program to entries in the look-up table, wherein the look-up table identifies which objects in the reduced-version of the language are duplicates of the full-version-only objects, and wherein the look-up table identifies which set of multiple-objects in the reduced-version of the language is functionally equivalent to a full-version-only object.

5. A system comprising:
a processor;
a data bus coupled to the processor;
a memory coupled to the data bus; and
a computer-usable medium embodying computer program code, the computer program code comprising instructions executable by the processor and configured for:
identifying any full-version-only objects that are not in a reduced-version of a language, wherein the reduced-version of the language comprises a subset of objects that are in a full-version of the language;
associating a full-version-only object with a set of multiple objects in the reduced-version of the language, wherein the full-version-only objects and the set of multiple objects in the reduced-version of the language are mutually exclusive, and wherein the full-version-only object is functionally equivalent to the set of multiple objects in the reduced-version of the language;
identifying said any full version only objects in a software program by constructing a look-up table that identifies which objects from a full version of the language are lacking in the reduced-version of the language;
utilizing the look-up table to replace any identified full-version-only objects with the functionally equivalent set of multiple objects from the reduced-version of the language; and
creating a reduced-version of the software program by replacing any identified full-version-only objects with a functionally equivalent set of multiple objects from the reduced-version of the language.

6. The system of claim 5, wherein the instructions are further configured for:
deploying the reduced-version of the software program to a device that supports only the reduced-version of the language.

7. The system of claim 5, wherein the instructions are further configured for:
inserting a join point at an identified full-version-only object in the software program, wherein the join point calls an aspect to override the identified full-version-only object with an advice, and wherein the advice contains the functionally equivalent set of one or more objects contained in the reduced-version of the language.

8. The system of claim 5, wherein the instructions are further configured for:
comparing every object in the software program to entries in the look-up table, wherein the look-up table identifies which objects in the reduced-version of the language are duplicates of the full-version-only objects, and wherein the look-up table identifies which set of multiple-objects in the reduced-version of the language is functionally equivalent to a full-version-only object.

9. A non-transitory computer storage medium embodying computer program code, the computer program code comprising computer executable instructions configured for:
identifying any full-version-only objects that are not in a reduced-version of a language, wherein the reduced-version of the language comprises a subset of objects that are in a full-version of the language;
associating a full-version-only object with a set of multiple objects in the reduced-version of the language, wherein the full-version-only objects and the set of multiple objects in the reduced-version of the language are mutually exclusive, and wherein the full-version-only object is functionally equivalent to the set of multiple objects in the reduced-version of the language;
identifying said any full version only objects in a software program by constructing a look-up table that identifies which objects from a full version of the language are lacking in the reduced-version of the language;
utilizing the look-up table to replace any identified full-version-only objects with the functionally equivalent set of multiple objects from the reduced-version of the language; and
creating a reduced-version of the software program by replacing any identified full-version-only objects with a functionally equivalent set of multiple objects from the reduced-version of the language.

10. The non-transitory computer storage medium of claim 9, wherein the computer executable instructions are configured for:
deploying the reduced-version of the software program to a device that supports only the reduced-version of the language.

11. The non-transitory computer storage medium of claim 9, wherein the computer executable instructions are configured for:
inserting a join point at an identified full-version-only object in the software program, wherein the join point calls an aspect to override the identified full-version-only object with an advice, and wherein the advice contains the functionally equivalent set of one or more objects contained in the reduced-version of the language.

12. The non-transitory computer storage medium of claim 9, wherein the computer executable instructions are configured for:
comparing every object in the software program to entries in the look-up table, wherein the look-up table identifies which objects in the reduced-version of the language are duplicates of the full-version-only objects, and wherein the look-up table identifies which set of multiple-objects in the reduced-version of the language is functionally equivalent to a full-version-only object.

13. The non-transitory computer storage medium of claim 9, wherein the computer executable instructions are deployable to a client computer from a server at a remote location.

14. The non-transitory computer storage medium of claim 9, wherein the computer executable instructions are provided by a service provider to a customer on an on-demand basis.

* * * * *